(12) United States Patent
Lin

(10) Patent No.: US 12,429,113 B1
(45) Date of Patent: Sep. 30, 2025

(54) CRANE MOTOR TRANSMISSION STRUCTURE

(71) Applicant: FA TENG TECHNOLOGY CO., LTD., Taichung (TW)

(72) Inventor: Shau-Yu Lin, Taichung (TW)

(73) Assignee: FA TENG TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 18/954,455

(22) Filed: Nov. 20, 2024

(30) Foreign Application Priority Data

Jun. 28, 2024 (TW) ................................ 113124175

(51) Int. Cl.
  *F16H 1/16* (2006.01)
  *F16H 57/021* (2012.01)
  *F16H 57/031* (2012.01)
  *F16H 57/039* (2012.01)
  *A63F 9/30* (2006.01)
  *G07F 17/32* (2006.01)

(52) U.S. Cl.
  CPC ............. *F16H 1/16* (2013.01); *F16H 57/021* (2013.01); *F16H 57/031* (2013.01); *F16H 57/039* (2013.01); *A63F 9/30* (2013.01); *G07F 17/3297* (2013.01)

(58) Field of Classification Search
  CPC ........ F16H 1/16; F16H 57/021; F16H 57/031; F16H 57/039; A63F 9/30; G07F 17/3297
  See application file for complete search history.

(56) References Cited

U.S. PATENT DOCUMENTS 6,899,337 B2 * 5/2005 Fisher ....................... A63F 9/30
                                                        273/447
2024/0157229 A1 * 5/2024 Lin ........................... A63F 9/30

FOREIGN PATENT DOCUMENTS

DE       102004020968 B4 * 7/2006 ............. F16H 55/24

* cited by examiner

*Primary Examiner* — Bobby Rushing, Jr.
(74) *Attorney, Agent, or Firm* — Ying-Ting Chen

(57) ABSTRACT

A crane motor transmission structure, includes a motor having a worm shaft, a transmission base, a gear, a shaft, and a side cover. The transmission base is disposed on the motor. The worm shaft is pivotally mounted on the transmission base. A first side of the transmission base has an opening. A second side of the transmission base has a first shaft hole opposite to the opening and a plurality of connecting screw holes. The transmission base is connected to the crane via the connecting screw holes. The shaft is inserted through the gear. One end of the shaft passes through the first shaft hole. The worm shaft meshes with the gear. The side cover has a second shaft hole. Another end of the shaft passes through the second shaft hole. The side cover closes the opening.

5 Claims, 6 Drawing Sheets

CRANE MOTOR TRANSMISSION STRUCTURE

BACKGROUND OF THE PRESENT INVENTION

Field of Invention

The present invention relates to a crane motor transmission structure, and more particularly to a crane motor having a worm shaft that is positioned in place and won't deflect when the motor outputs power, so as to avoid disengagement of the worm shaft or wear of the gear. The worm shaft meshes with the gear stably to avoid excessive looseness or tightness.

Description of Related Arts

A conventional claw machine, as shown in FIG. 1 through FIG. 3, comprises a box body 10, two longitudinal guide rails 11 symmetrically arranged in the box body 10, a movable seat 12, and a crane 20. The movable seat 12 and the crane 20 are slidable between the longitudinal guide rails 11. The mobile seat 12 includes a left bracket 13 and a right bracket 14. Two transverse guide rails 15 are provided between the left bracket 13 and the right bracket 14. The crane 20 is slidably connected to the transverse guide rails 11. The movable seat 12 is driven by external power to slide between the longitudinal guide rails 11. The crane 20 includes a main body 21. The main body 21 has a front partition 22 and a rear partition 23. A first bushing 24 and a second bushing 25 are provided between the front partition 22 and the rear partition 23. The first bushing 24 has a first shaft hole 241. A first shaft 26 passes through the first shaft hole 241. The second bushing 25 has a second shaft hole 251. A second shaft 27 passes through the second shaft hole 251. The first shaft 26 is inserted through a first gear 28, and the front and rear ends of the first shaft 26 are connected to transmission wheels 29. The second shaft 27 is inserted through a reel 30 and a second gear 31. The front and rear ends of the second shaft 26 are pivotally connected to rollers 32. The transmission wheels 29 of the first shaft 26 and the rollers 32 of the second shaft 27 are movable along the transverse guide rails 15, respectively. Two L-shaped connecting plates 33 are connected to the rear partition 23. The L-shaped connecting plates 33 each have a vertical plate portion 331 and a horizontal plate portion 332. The vertical plate portion 331 is locked to the rear partition 23. The horizontal plate portion 332 is locked to a motor 34 having a worm shaft 35. The two worm shafts 35 of the motors 34 mesh with the first gear 28 and the second gear 31, respectively. One of the motors 34 drives the first gear 28 to rotate the first shaft 26 and the transmission wheels 29, so that the crane 20 can move along the transverse guide rails 15. The other motor 34 drives the second gear 31 to rotate the second shaft 27 and the reel 30. A cable 36 is wound around the reel 30. A claw 37 is connected to the end of the cable 36. The claw 37 is driven to move up and down.

However, in the above structure, the motor 34 is assembled and fixed through the L-shaped connecting plate 33. When assembling, the assembler will adjust the pressing force of the worm shafts 35 against the first gear 28 and the second gear 31 according to his/her experience. As the worm shaft 35 will generate a reaction force when driving the gear, the L-shaped connecting plate 33 will be deformed, so that the worm shaft 35 will deflect (as shown in FIG. 3), resulting in a change in the pressing force. It is not possible to maintain a constant pressing force. If the pressing force is too less, the worm shaft 35 will disengage from the first gear 28 or the second gear 31. If the pressing force is too much, the first gear 28 or the second gear 31 made of plastic material will wear out quickly. When the wear is severe, the worm shaft 35 will disengage from the first gear 28 or the second gear 31, so the crane 20 will often need to be serviced.

When the player operates the claw machine, he/she adjusts the worm shaft 35 of the motor 34 by forward and reverse rotation in order to align the claw 37 with the desired position. This is more likely to disengage the worm shaft 35 from the first gear 28 and causes wear. Frequent maintenance not only reduces the profits of the operators but also reduces players' interest in playing. Accordingly, the inventor of the present invention has devoted himself based on his many years of practical experiences to solve these problems.

SUMMARY OF THE PRESENT INVENTION

The primary object of the present invention is to solve the aforesaid problems and to provide a crane motor transmission structure. A transmission base is disposed on a motor. The transmission base can position a gear and a shaft in place. The end of a worm shaft of the motor is pivoted and positioned by the transmission base so that the worm shaft does not deflect when the motor outputs power, so as to avoid disengagement of the worm shaft or wear of the gear. The worm shaft meshes with the gear with a constant force, which makes the gear more durable, avoids an increase in maintenance costs, and outputs power more stably.

In order to achieve the foregoing object, the present invention provides a crane motor transmission structure. The crane motor transmission structure is disposed on a crane of a claw machine, and comprises a motor having a worm shaft, a transmission base, a gear, a shaft, and a side cover. The transmission base is hollow and has a transmission chamber therein. The transmission base is disposed on the motor and covers the worm shaft. The worm shaft has a pivot section at one end thereof. The transmission base has a positioning hole corresponding in position to the pivot section and communicating with the transmission chamber. The pivot section is pivoted in the positioning hole. A first side of the transmission base has an opening relative to the transmission chamber. A second side of the transmission base has a first shaft hole opposite to the opening. The first side of the transmission base further has a plurality of locking screw holes. The second side of the transmission base further has a plurality of connecting screw holes. The transmission base is connected to the crane via the connecting screw holes. The shaft is inserted through the gear. One end of the shaft passes through the first shaft hole and extends out of the transmission base. The worm shaft meshes with the gear in the transmission chamber. The side cover is configured for closing the opening. The side cover has a second shaft hole corresponding to the first shaft hole. An outer periphery of the side cover has a plurality of apertures corresponding in position to the respective locking screw holes. Another end of the shaft passes through the second shaft hole and extends out of the side cover. Screws are inserted in the apertures and screwed to the respective locking screw holes, so that the side cover closes the opening.

In an embodiment of the present invention, the pivot section has a diameter less than that of the worm shaft.

In an embodiment of the present invention, a shaft sleeve is provided in the positioning hole, and the pivot section is pivoted in the shaft sleeve.

In an embodiment of the present invention, the shaft sleeve is a self-lubricating bearing.

In an embodiment of the present invention, the second side of the transmission base further has a first bearing recess inside the transmission chamber opposite to the opening. The first shaft hole runs through the first bearing recess. A first bearing is provided in the first bearing recess. The shaft passes through the first bearing and the first shaft hole. One side of the side cover, facing the opening, has a second bearing recess. The second shaft hole runs through the second bearing recess. A second bearing is provided in the second bearing recess. The shaft passes through the second bearing and the second shaft hole.

With the above structure, the transmission base positions the worm shaft in place, which can prevent the worm shaft from deflecting, enabling the worm shaft to mesh with the gear stably to avoid excessive looseness or tightness.

DETAILED DESCRIPTION OF THE PREFERRED EMBODIMENT

Embodiments of the present invention will now be described, by way of example only, with reference to the accompanying drawings.

Figure 1:
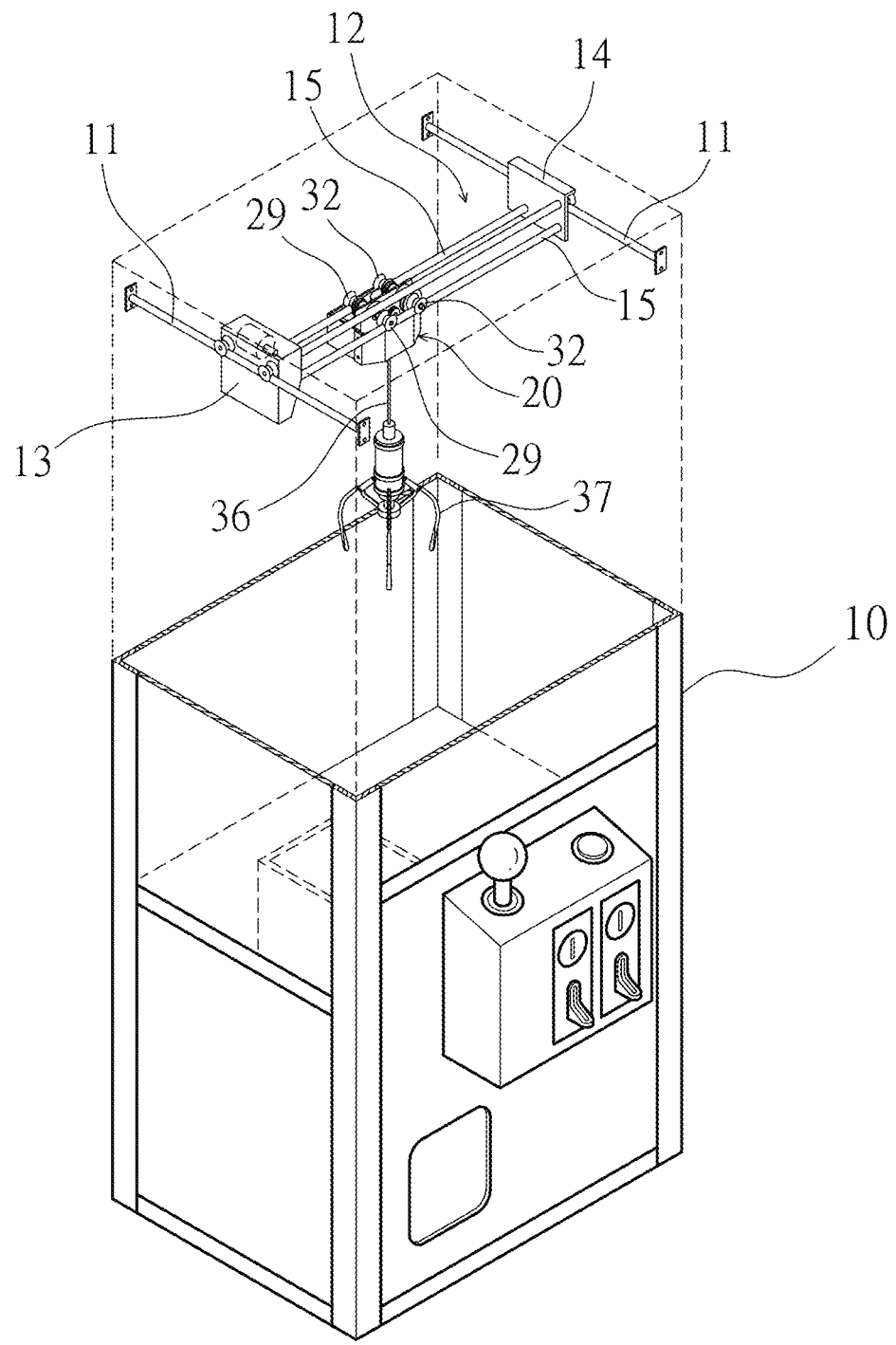
FIG. 1 is a perspective view of a conventional claw machine.
Figure 2:
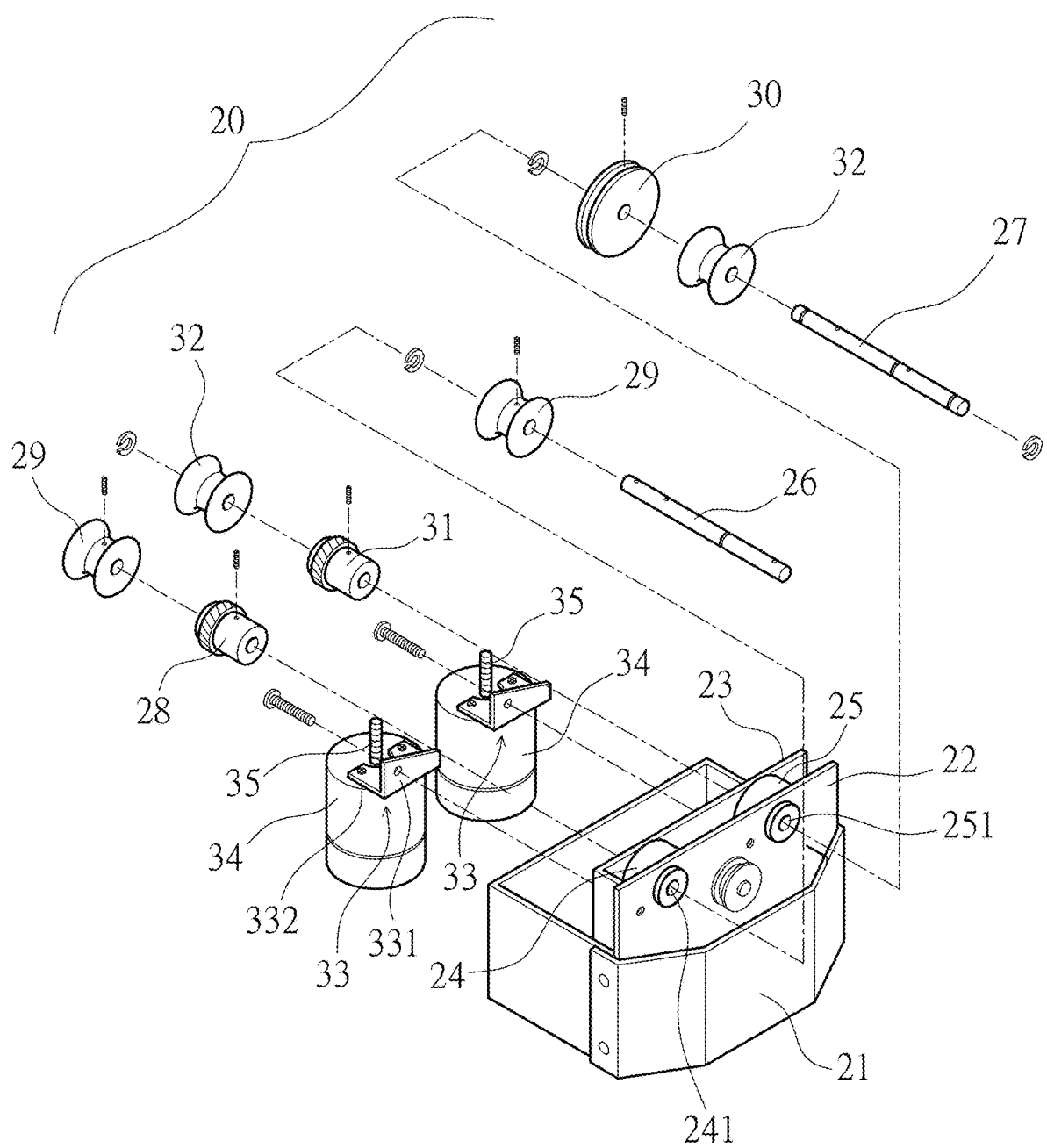
FIG. 2 is an exploded view of a conventional crane.
Figure 3:
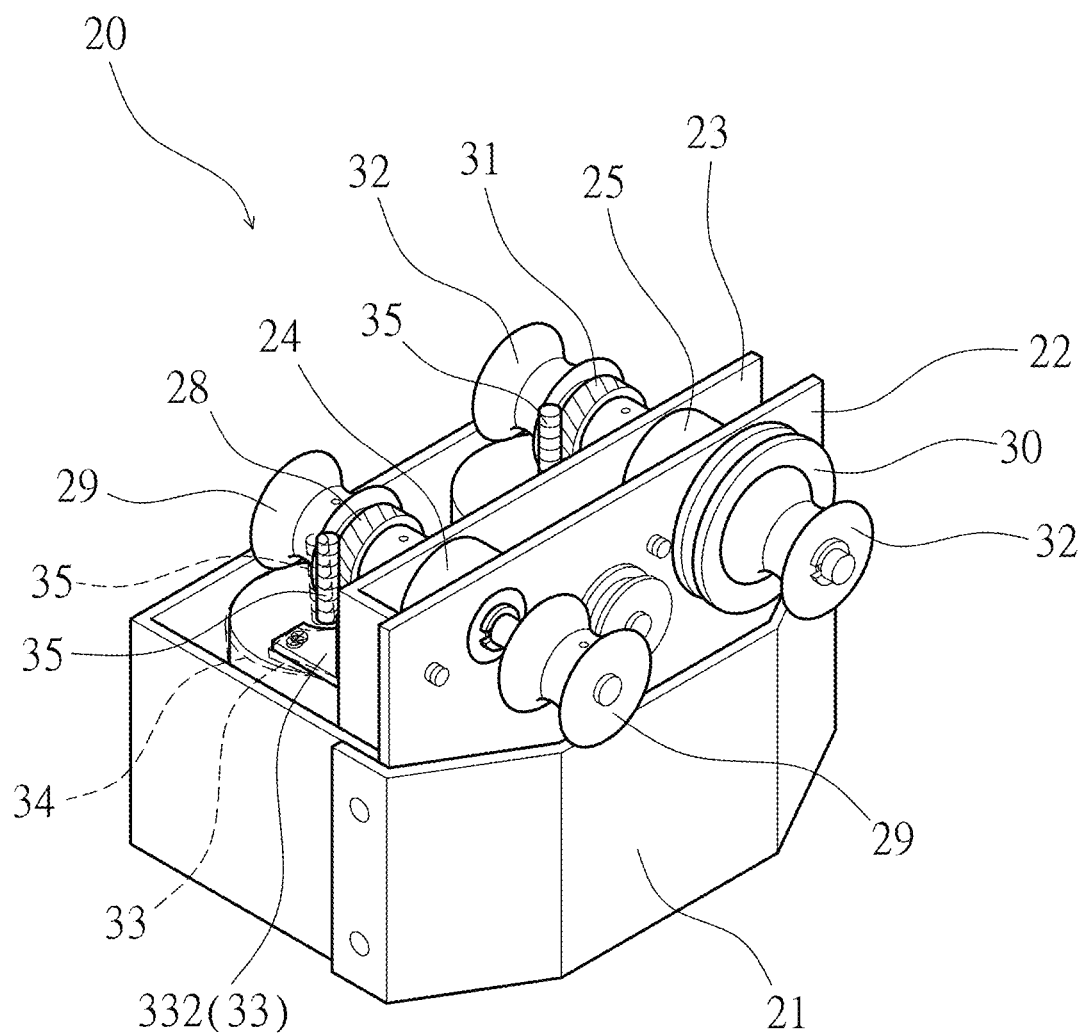
FIG. 3 is a schematic view of the conventional crane, illustrating the deflection of the worm shaft.
Figure 4:
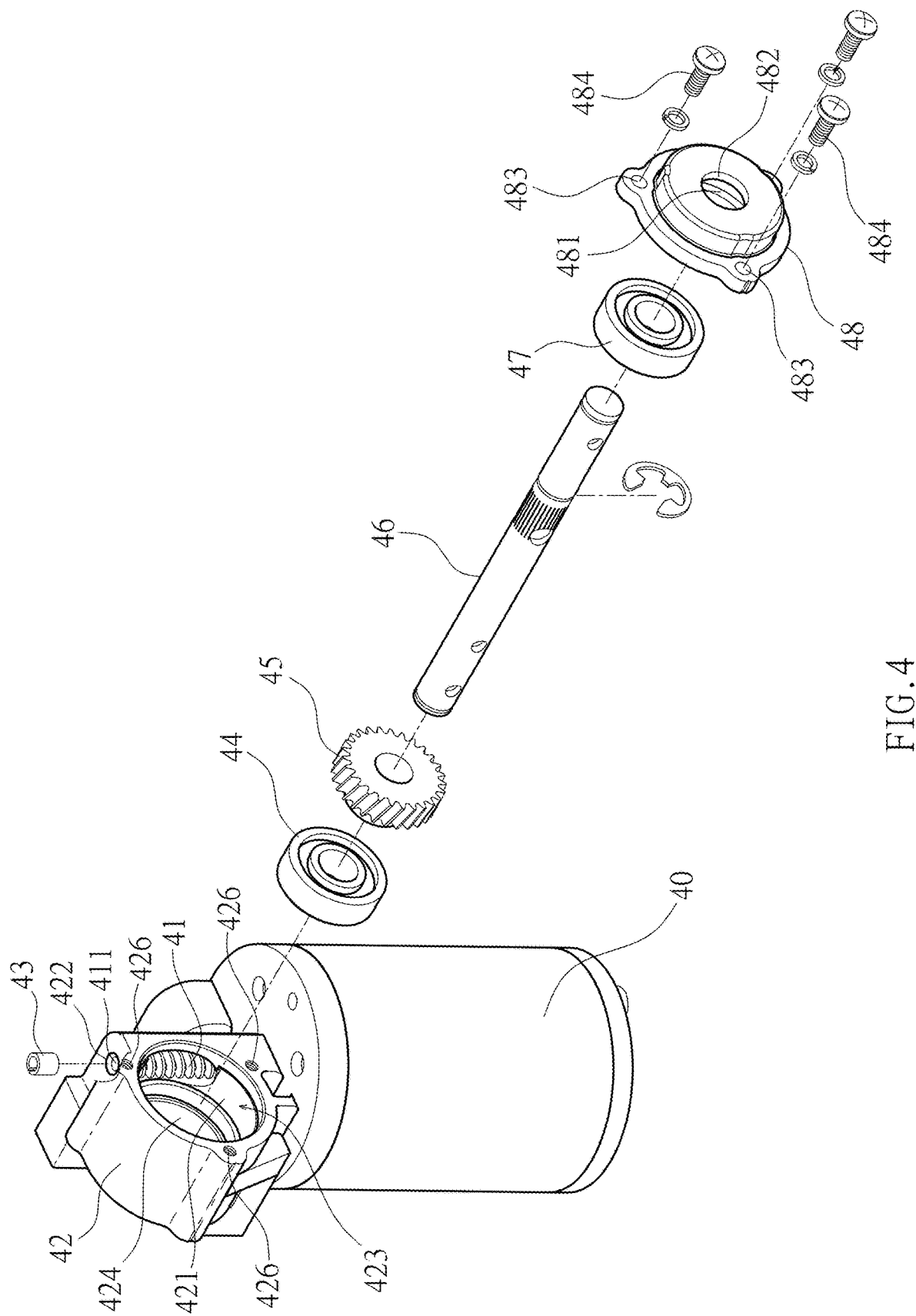
FIG. 4 is an exploded view of the present invention.
Figure 5:
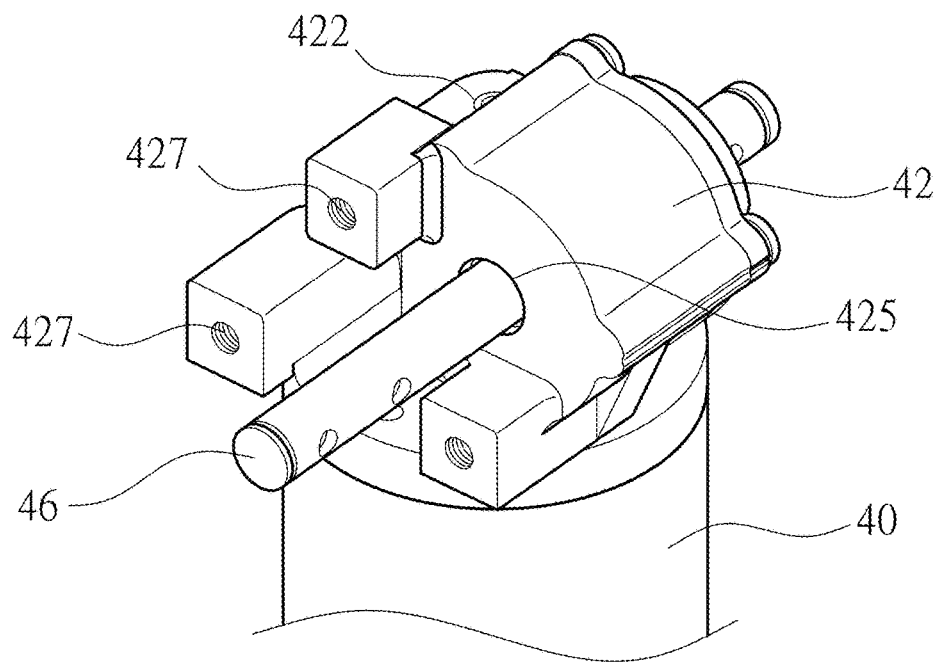
FIG. 5 is a rear perspective view of the present invention.
Figure 6:
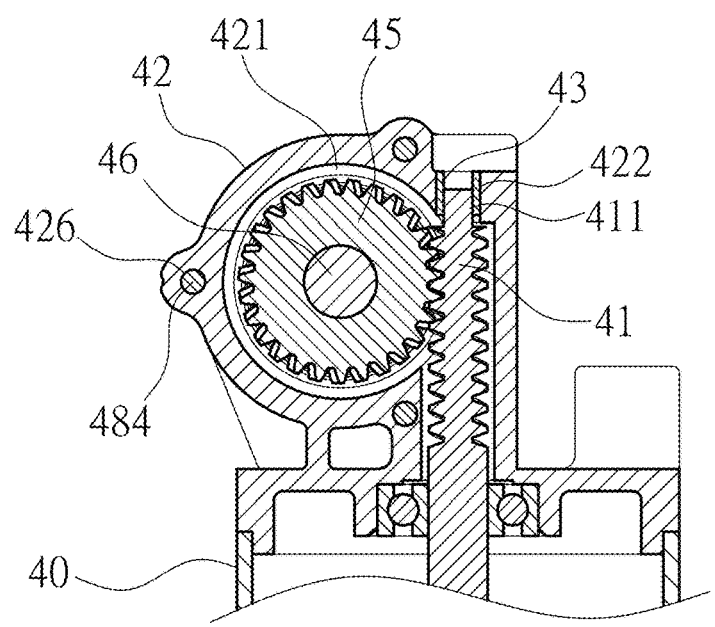
FIG. 6 is a sectional schematic view of the present invention, illustrating that the worm shaft meshes with the gear.
Figure 7:
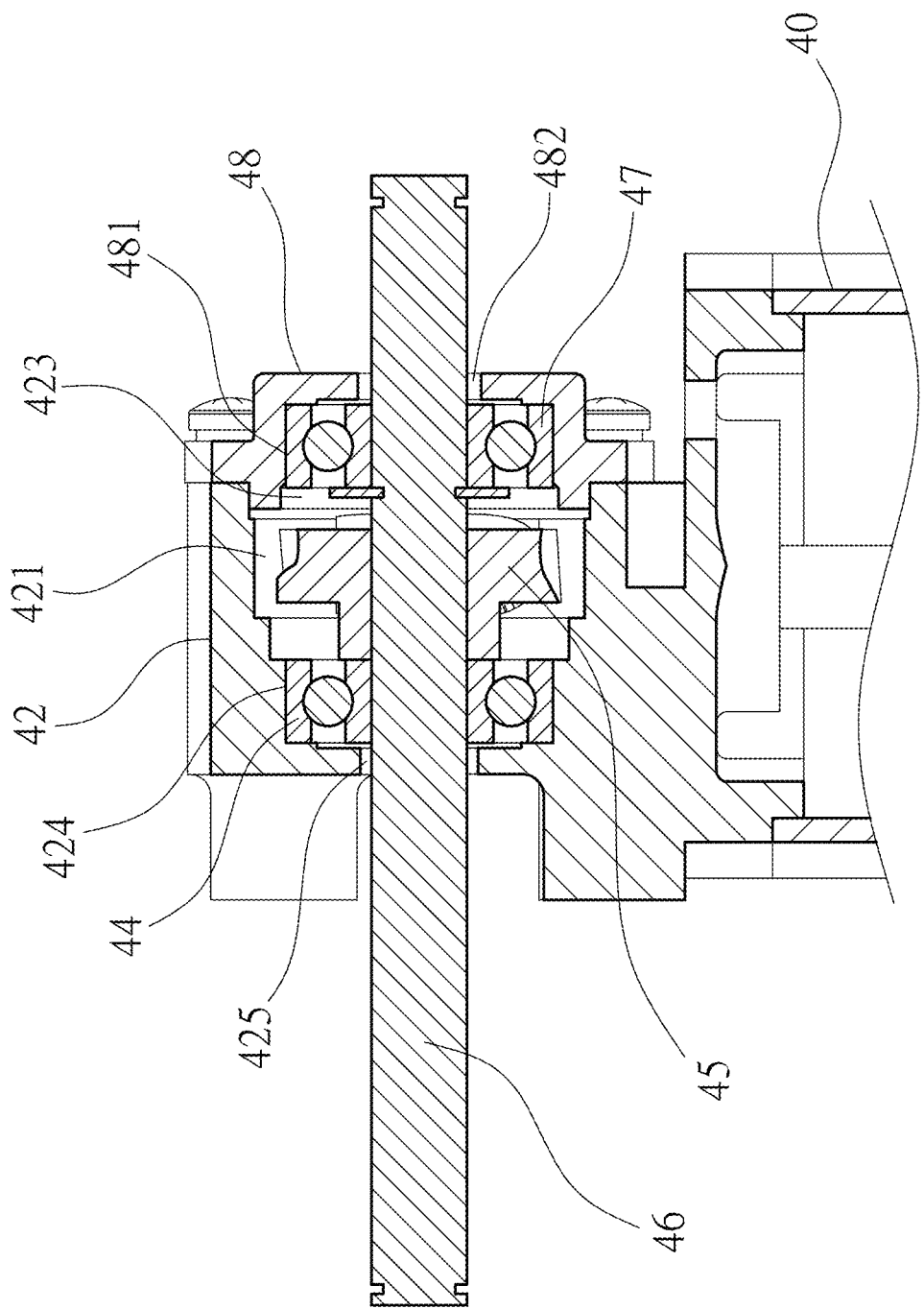
FIG. 7 is a partial cross-sectional view of the present invention.

Referring to FIG. 4 through FIG. 7, the present invention discloses a crane motor transmission structure. The crane motor transmission structure is disposed on a crane of a claw machine. The crane motor transmission structure comprises a motor 40 having a worm shaft 41, a transmission base 42, a shaft sleeve 43, a first bearing 44, a gear 45, a shaft 46, a second bearing 47, and a side cover 48. The transmission base 42 is hollow and has a transmission chamber 421 therein. The transmission base 42 is disposed on the motor 40 and covers the worm shaft 41. One side of the worm shaft 41 is exposed in the transmission chamber 421. The worm shaft 41 has a pivot section 411 at one end thereof. The diameter of the pivot section 411 is less than the diameter of the worm shaft 41. The transmission base 42 has a positioning hole 422 corresponding in position to the pivot section 411 and communicating with the transmission chamber 421. The shaft sleeve 43 is connected in the positioning hole 422. The pivot section 411 of the worm shaft 41 is pivotally connected in the shaft sleeve 43. A first side of the transmission base 42 has an opening 423 relative to the transmission chamber 421. A second side of the transmission base 42 has a first bearing recess 424 inside the transmission chamber 421. The first bearing recess 424 is opposite to the opening 423. The transmission base 42 further has a first shaft hole 425 running through the first bearing recess 424. The first bearing 44 is connected in the first bearing recess 424. The first side of the transmission base 42 is formed with a plurality of locking screw holes 426, and the second side of the transmission base 42 is formed with a plurality of connecting screw holes 427. The transmission base 42 is connected to the crane through the connecting screw holes 427. The shaft 46 is inserted through the gear 45. One end of the shaft 46 passes through the first bearing 44 and the first shaft hole 425 and extends out of the transmission base 42. The worm shaft 41 meshes with the gear 45 in the transmission chamber 421. The side cover 48 is configured to close the opening 423. One side of the side cover 48, facing the opening 423, has a second bearing recess 481 and a second shaft hole 425 running through the second bearing recess 481 and corresponding to the first shaft hole 425. The second bearing 47 is connected in the second bearing recess 481. The outer periphery of the side cover 48 has a plurality of apertures 483 corresponding in position to the respective locking screw holes 426. The other end of the shaft 46 passes through the second bearing 47 and the second shaft hole 482 and extends out of the side cover 48. Screws 484 are inserted in the apertures 483 and screwed to the respective locking screw holes 426, so that the side cover 48 closes the opening 423. The shaft 46 outputs the power for the movement or retraction of the crane. With the above structure, the transmission base 42 positions the pivot section 411 of the worm shaft 41 in place, which can prevent the worm shaft 41 from deflecting, enabling the worm shaft 41 to mesh with the gear 45 with a constant force, so as to avoid excessive looseness or tightness.

The assembly, function and efficacy of the above embodiment are described in detail below. Referring to FIG. 4 through FIG. 7, in the present invention, the transmission base 42 is configured to integrate the motor 40, the gear 45 and the shaft 46 into a single assembly. The pivot section 411 of the worm shaft 41 is pivotally connected in the shaft sleeve 43 located in the positioning hole 422. The shaft sleeve 43 is a self-lubricating bearing. In addition to reducing the rotational friction of the worm shaft 41, the shaft sleeve 43 positions the end of the worm shaft 41 in place so that the worm shaft 41 is rotated stably without deflection. Thus, the worm shaft 41 meshes with the gear 45 stably. Understandably, the worm shaft 41 is positioned in place, which can prevent improper wear of the gear 45, extends the service life of the gear 45, and avoid an increase in maintenance costs.

Furthermore, since the transmission base 42 is combined with each transmission component in a fixed position, there is no need for experienced professionals to adjust the pressing force of the worm shaft 41 meshing with the gear 45, so as to achieve the effect of easy and fast assembly. Even if the player quickly adjusts the worm shaft 41 to move the position of the crane by forward and reverse rotation when the claw machine is operated, the worm shaft 41, the gear 45 and the shaft 46 are positioned stably, such that the transmission process of the motor 40 is smooth and stable, without jitter.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A crane motor transmission structure, disposed on a crane of a claw machine, comprising a motor having a worm shaft, a transmission base, a gear, a shaft, and a side cover; the transmission base being hollow and having a transmission chamber therein, the transmission base being disposed on the motor and covering the worm shaft, the worm shaft having a pivot section at one end thereof, the transmission base having a positioning hole corresponding in position to the pivot section and communicating with the transmission chamber, the pivot section being pivoted in the positioning hole; a first side of the transmission base having an opening relative to the transmission chamber, a second side of the transmission base having a first shaft hole opposite to the opening; the first side of the transmission base further having a plurality of locking screw holes, the second side of the transmission base further having a plurality of connecting screw holes, the transmission base being connected to the crane through the connecting screw holes; the shaft being inserted through the gear, one end of the shaft passing through the first shaft hole and extending out of the transmission base, the worm shaft meshing with the gear in the transmission chamber; the side cover being configured for closing the opening, the side cover having a second shaft hole corresponding to the first shaft hole; an outer periphery of the side cover having a plurality of apertures corresponding in position to the respective locking screw holes, another end of the shaft passing through the second shaft hole and extending out of the side cover, screws being inserted in the apertures and screwed to the respective locking screw holes so that the side cover closes the opening.

2. The crane motor transmission structure as claimed in claim 1, wherein the pivot section has a diameter less than that of the worm shaft.

3. The crane motor transmission structure as claimed in claim 2, wherein a shaft sleeve is provided in the positioning hole, and the pivot section is pivoted in the shaft sleeve.

4. The crane motor transmission structure as claimed in claim 3, wherein the shaft sleeve is a self-lubricating bearing.

5. The crane motor transmission structure as claimed in claim 1, wherein the second side of the transmission base further has a first bearing recess inside the transmission chamber opposite to the opening, the first shaft hole runs through the first bearing recess, a first bearing is provided in the first bearing recess, the shaft passes through the first bearing and the first shaft hole; one side of the side cover, facing the opening, has a second bearing recess, the second shaft hole runs through the second bearing recess, a second bearing is provided in the second bearing recess, and the shaft passes through the second bearing and the second shaft hole.

* * * * *